United States Patent
Kim et al.

(10) Patent No.: US 8,923,342 B2
(45) Date of Patent: Dec. 30, 2014

(54) METHOD OF PROVIDING TIMING INFORMATION FOR SYNCHRONIZING MMT PACKET STREAM IN MMT HYBRID DELIVERY SERVICE AND METHOD OF SYNCHRONIZING MMT PACKET STREAM IN MMT HYBRID DELIVERY SERVICE

(75) Inventors: Sung Hei Kim, Daejeon-si (KR); Kwang Deok Seo, Wonju-si (KR); Tae Jun Jung, Wonju-si (KR); Chang Kyu Lee, Daejeon-si (KR); Shin Gak Kang, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 205 days.

(21) Appl. No.: 13/546,994

(22) Filed: Jul. 11, 2012

(65) Prior Publication Data

US 2013/0016282 A1 Jan. 17, 2013

(30) Foreign Application Priority Data

Jul. 12, 2011 (KR) .................. 10-2011-0069091
Jul. 18, 2011 (KR) .................. 10-2011-0071200
Nov. 10, 2011 (KR) .................. 10-2011-0117177

(51) Int. Cl.
*H04J 3/06* (2006.01)
*H04N 21/242* (2011.01)
*H04N 21/8547* (2011.01)
*H04N 21/43* (2011.01)

(52) U.S. Cl.
CPC ......... *H04N 21/242* (2013.01); *H04N 21/8547* (2013.01); *H04N 21/4305* (2013.01)
USPC ....................................... 370/503

(58) Field of Classification Search
CPC ...... H04N 5/93; H04L 7/008; H04L 12/2856; H04L 5/24
See application file for complete search history.

(56) References Cited

U.S. PATENT DOCUMENTS 5,602,992 A * 2/1997 Danneels ............ 709/248
2006/0168133 A1 * 7/2006 Park et al. ............ 709/219

FOREIGN PATENT DOCUMENTS

WO    WO 2009/150578 A2    12/2009

* cited by examiner

*Primary Examiner* — Huy D Vu
*Assistant Examiner* — Teisha D Hall (57) ABSTRACT

A method of providing timing information for synchronizing packet streams delivered from a first server and a second server, respectively, that are different from each other under hybrid delivery service environment is provided. The first server delivers a first media object and the second server delivers a second media object. The timing information for synchronizing a second packet including the second media object and a first packet including the first media object is generated in the second server. The timing information and the second packet including the second media object are provided from the second server to the client.

20 Claims, 6 Drawing Sheets

METHOD OF PROVIDING TIMING INFORMATION FOR SYNCHRONIZING MMT PACKET STREAM IN MMT HYBRID DELIVERY SERVICE AND METHOD OF SYNCHRONIZING MMT PACKET STREAM IN MMT HYBRID DELIVERY SERVICE

CROSS-REFERENCE TO RELATED APPLICATIONS

This application claims the benefit of priority of Korean Patent Application No. 10-2011-0069091 filed on Jul. 12, 2011, Korean Patent Application No. 10-2011-0071200 filed on Jul. 18, 2011, and Korean Patent Application No. 10-2011-0117177 filed on Nov. 10, 2011, all of which are incorporated by reference in their entirety herein.

BACKGROUND OF THE INVENTION

1. Field of the Invention

The present invention relates to a method of providing timing information for providing multimedia application services and a method of synchronizing multimedia application services, and more particularly, to a method of providing timing information for providing multimedia application services of a hybrid delivery service delivered from different servers by a plurality of media objects configuring a single service and a method of synchronizing multimedia application services.

2. Related Art

An MPEG media transport (MMT) is a new media transport standard technology that is ambitiously developing in a moving picture experts group (MPEG) system sub-working group.

An MPEG-2 system, a standard for functions such as packetization, synchronization, multiplexing, or the like, that are required to deliver audio video (AV) contents in a broadcast network standardizes an MPEG-2 transport stream technology and has been prevalently used. However, a network the MPEG-2 TS is inefficient under new environment in which a network is based on All Internet protocol (All IP).

Therefore, the Joint Technical Committee (JTC) 1 of the International Organization for Standardization (ISO) and the International Electrotechnical Commission (IEC), subcommittee (SC) 29, working group (WG) 11 (ISO/IEC/JTC1/SC29/WG11) MPEG recognizes a need of a new media transport standard in consideration of new media transport environment and media transport environment expected in the future and starts MMT standardization. As standardization for the MMT that is currently being performed in the MPEG in June, 2011, a technology under consideration (TuC) document and working draft (WD) version 2.0 ISO/IEC/JTC1/SC29/WG11 N11953 "Working Draft of MPEG Media Transport" (March, 2011, Geneva, Swiss) have been published.

In the MMT service, different media objects may be delivered from a plurality of different servers to a single client apparatus through heterogeneous network environment. In this case, the client apparatus needs to serve a plurality of received media objects in an integrated type.

However, a synchronization method in an in-band signaling scheme or an out-of-band signaling scheme that appropriately serves the plurality of media objects delivered under different heterogeneous network environments in a single integrated type is not provided.

SUMMARY OF THE INVENTION

The present invention provides a method of providing timing information for synchronizing packet streams delivered from a first server and a second server, respectively, that are different from each other so as to smoothly provide multimedia application services under hybrid delivery service environment.

In addition, the present invention has been made in an effort to provide a method of synchronizing packet streams delivered from a first server and a second server, respectively, that are different from each other so as to smoothly provide multimedia application services under hybrid delivery service environment.

In an aspect, A method of providing timing information for synchronizing packet streams delivered from a first server and a second server, respectively, that are different from each other under hybrid delivery service environment, the first server delivering a first media object and the second server delivering a second media object, the method includes: generating timing information for synchronizing a second packet including the second media object and a first packet including the first media object with each other in the second server; and providing the timing information and the second packet including the second media object from the second server to a client. The timing information for synchronizing the first packet and the second packet with each other may be delivered only once from the second server to the client through a first MMT packet. The timing information may include: an Hybrid_Network_Synch_Flag field that represents whether it includes timing information required for the synchronization; an MCR_Resolution_Flag field that represents frequency resolution of an MMT clock reference (MCR); an Initial_Clock_Ticks_Base field that represents an MCR clock value corresponding to an original service start time of the second media object as clock resolution of 90 kHz; and an Initial_Clock_Ticks_Ext field that represents an MCR clock corresponding to the original service start time of the second media object as clock resolution of 27 MHz. When a value of the Hybrid_Network_Synch_Flag field is 1, it may represent that the packet to be currently delivered from the second server includes an MMT packet or a control message having the timing information for synchronizing the hybrid delivery service and the MCR_Resolution_Flag field is present and has a valid value; and when a value of the Hybrid_Network_Synch_Flag field is 0, it may represent that the packet to be currently delivered from the second server is not the MMT packet or the control message including the timing information for synchronizing the hybrid delivery service.

In another aspect, a method of providing timing information for synchronizing packet streams delivered from a first server and a second server, respectively, that are different from each other under hybrid delivery service environment, the first server delivering a first media object to a client and the second server delivering a second media object to the client, the method includes: generating from the second sever timing information for synchronizing a second packet including the second media object and a first packet including the first media object with each other in the client; and determining whether the first packet including the first media object and the second packet including the second media object are synchronized with each other by using the timing information in the client. The timing information for synchronizing the first packet and the second packet with each other may be delivered only once from the second server to the client through a first MMT packet.

A server of providing timing information for synchronizing packet streams delivered from a first server and a second server, respectively, that are different from each other under hybrid delivery service environment, the first server delivering a first media object and the second server delivering a second media object, the server includes: a timing information generator that generates timing information for synchronizing a packet including the second media object and a packet including the first media object with each other in the second server; an MMT packet generator that packetizes and generates the packet including the second media object; and an MMT packet delivery unit that delivers the packet including the generated second media object to the client.

DESCRIPTION OF EXEMPLARY EMBODIMENTS

Since the present invention may be variously modified and have several exemplary embodiments, specific exemplary embodiments will be shown in the accompanying drawings and be described in detail.

However, it is to be understood that the present invention is not limited to the specific exemplary embodiments, but includes all modifications, equivalents, and substitutions included in the spirit and the scope of the present invention.

In describing exemplary embodiments of the present invention, well-known functions or constructions will not be described in detail since they may unnecessarily obscure the understanding of the present invention.

Terms used in the specification, 'first', 'second', etc. can be used to describe various components, but the components are not to be construed as being limited to the terms. The terms are only used to differentiate one component from other components. For example, the 'first' component may be named the 'second' component and the 'second' component may also be similarly named the 'first' component, without departing from the scope of the present invention. The term 'and/or' includes a combination of a plurality of items or any one of a plurality of terms.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Terms used in the present specification are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Furthermore, constitutional parts shown in the embodiments of the present invention are independently shown so as to represent different characteristic functions. Thus, it does not mean that each constitutional part is constituted in a constitutional unit of separated hardware or one software. In other words, each constitutional part includes each of enumerated constitutional parts for convenience of explanation. Thus, at least two constitutional parts of each constitutional part may be combined to form one constitutional part or one constitutional part may be split into a plurality of constitutional parts to perform each function. The embodiment where each constitutional part is combined and the embodiment where one constitutional part is split are also included in the scope of the present invention, if not departing from the essence of the present invention.

Unless indicated otherwise, it is to be understood that all the terms used in the specification including technical and scientific terms has the same meaning as those that are understood by those who skilled in the art. It must be understood that the terms defined by the dictionary are identical with the meanings within the context of the related art, and they should not be ideally or excessively formally defined unless the context clearly dictates otherwise.

Hereinafter, exemplary embodiments of the present invention will be described in more detail with reference to the accompanying drawings. In order to facilitate the general understanding of the present invention in describing the present invention, through the accompanying drawings, the same reference numerals will be used to describe the same components and an overlapped description of the same components will be omitted.

When a plurality of media objects are delivered from different servers in heterogeneous network environment, 1) resolution of a system time clock (STC) that is adopted by each server may be different and timing at which each media object is delivered may be different and thus, it is difficult to implement synchronization and 2) even though the resolution of the STC adopted by the servers is the same, each media object may experience different jitters due to the delivery through the heterogeneous network and thus, it is difficult to integrate the delivered media objects so as to be provided as a single synchronized media service.

The problem can be solved by performing synchronization processing in an MMT delivery (D) layer or an MMT Signal (S) layer that defines a format and a function required to deliver encapsulated media data among components of an MMT service through a network. When performing the synchronization processing at the S layer, it is preferable to perform a process at a S.1 layer that performs a function of controlling the D layer. When performing the synchronization processing at the D layer, it is preferable to perform the processing at the D.2 layer that is responsible for a function of supplementing time information for hybrid network synchronization to deliver media using a heterogeneous network.

However, a method of solving a hybrid network synchronization problem at the MMT D layer by using an in-band signaling scheme has not yet been proposed. In this case, the in-band signaling means that data and control information are delivered together in the same band or through the same channel.

In accordance with the embodiment of the present invention, for providing the hybrid network synchronization, an out-of-band signaling scheme delivering the timing information for synchronization may be first delivered to the client apparatus by being included in the control message of the S.1 layer before the initial MMT data packets are delivered or the timing information for synchronization may be directly supplemented to a header of the D.2 layer within a first MMT packet by the in-band signaling scheme. The timing information is informed only once through the first MMT packet in the MMT server and the timing information is used in the client apparatus receiving the MMT packet, thereby preventing traffic for the network from increasing and very simplifying the processing at the receiving side.

In order to perform the method of synchronizing the above-mentioned hybrid network, the embodiment of the present invention sets and delivers the timing information having an appropriate size in the header of the MMT D.2 layer when delivering the first MMT packet requested by a user from the server to the client apparatus. To this end, four timing information related fields to be set in the MMT D.2 layer header are defined. Further, a method of appropriately setting the four timing information by the server is defined. Further, after the client apparatus receives the first MMT packet from the server, when there is a need to synchronize the plurality of media objects, a method of confirming and processing the synchronization among the plurality of media objects delivered through the heterogeneous network by using the timing information received from the server is defined.

Figure 1:
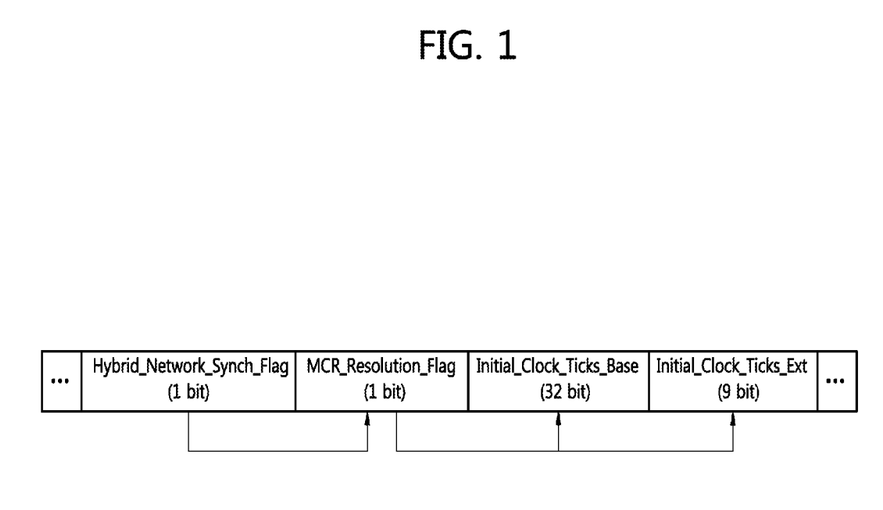
FIG. 1 shows an example of timing information used for synchronizing packet streams in accordance with an embodiment of the present invention under MPEG Media Transport (MMT) hybrid delivery service environment.
Figure 2:
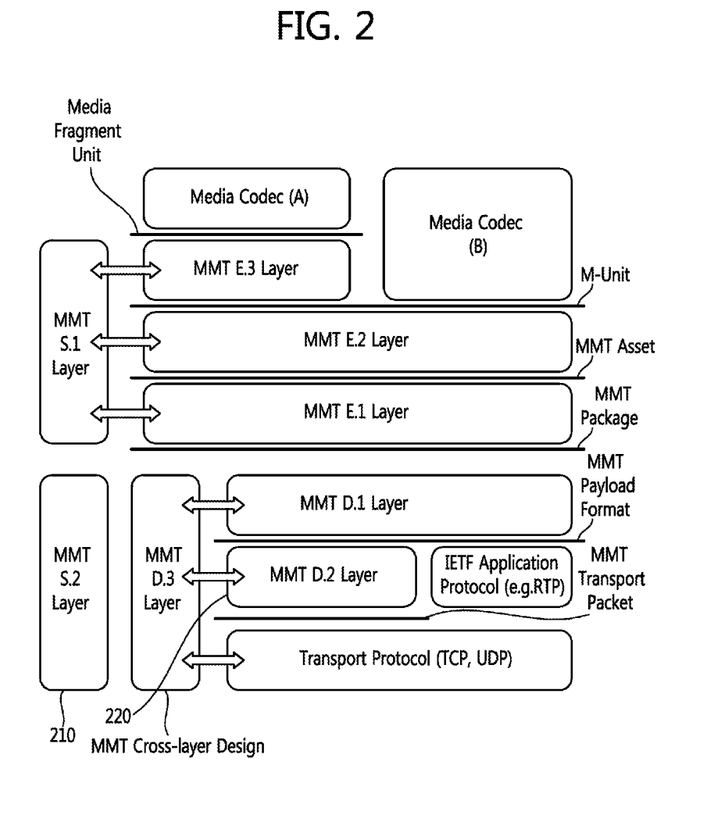
FIG. 2 is an example of a configuration of each layer of the MMT in accordance with the embodiment of the present invention.

FIG. 1 shows an example of timing information used for synchronizing packet streams in accordance with an embodiment of the present invention under MPEG Media Transport (MMT) hybrid delivery service environment and FIG. 2 is an example of a configuration of each layer of the MMT in accordance with the embodiment of the present invention.

Referring to FIG. 1, the timing information used for synchronizing packet streams under the hybrid delivery service environment may include a Hybrid_Network_Synch_Flag field, an MCR_Resolution_Flag field, an Initial_Clock_Ticks_Base field, and an Initial_Clock_Ticks_Ext field.

The timing information used for synchronizing the packet streams under the hybrid delivery service environment is informed only once through the first MMT packet from the server to the MMT client apparatus or an MMT client terminal.

The timing information may be delivered by being included in, for example, the control message of the MMT S layer shown in FIG. 2. In detail, the timing information may be delivered by being included in the control message of the MMT S.2 layer showing in FIG. 2. In addition, the timing information may also be delivered by being included in the control message of the MMT S.1 layer.

Alternatively, the timing information may also be delivered by being included in the header of the MMT D layer shown in FIG. 2. In detail, the timing information may also be delivered by being included in the header of the MMT D.2 layer shown in FIG. 2. In this case, the header of the MMT D.2 layer corresponds to a header of an MMT transport packet of FIG. 2. Meanwhile, the timing information may be delivered by being included in a header of an MMT payload format that is the header of the MMT D.1 layer.

The timing information used for synchronizing packet streams under the hybrid delivery service environment has a predetermined size. For example, the Hybrid_Network_Synch_Flag field is configured of 1 bit, the MCR_Resolution_Flag field is configured of 1 bit, the Initial_Clock_Ticks_Base field is configured of 32 bits, and the Initial_Clock_Ticks_Ext field is configured of 9 bits, such that the timing information may be configured of a total of 43 bits. However, the number of bits for each field is not limited thereto and the number of bits for synchronization may also be appropriately configured.

The Hybrid_Network_Synch_Flag field may be configured of, for example, 1 bit and represents whether it includes the timing information required for synchronization.

When a value of the Hybrid_Network_Synch_Flag field is 1, it represents that the MMT packet to be currently delivered is an initially delivered packet after a delivery service for program starts and means that the timing information is present. In this case, the second field, the MCR_Resolution_Flag field is present, which means that a value of the corresponding field is valid.

When a value of the Hybrid_Network_Synch_Flag field is 0, it represents that the MMT packet to be currently delivered is not a packet initially delivered after a delivery service for program starts and means that the remaining three fields are not present.

The MCR_Resolution_Flag field may be configured of, for example, 1 bit and represents frequency resolution of an MMT clock reference (MCR). The MCR may be written in the control message of the MMT S.1 layer or the header of the MMT D.2 layer shown in FIG. 2 but is not limited thereto. Therefore, the MCR may be written in a control message or a header of other MMT layers such as the header of the MMT D.1 layer, the control message of the MMT S.1 layer, or the like.

A value of the MCR_Resolution_Flag field is used to represent a value of the Initial_Clock_Ticks with the same precision as the clock resolution of the MCR. When a value of the MCR_Resolution_Flag field is 1, it means that the frequency resolution of the MCR is 90 kHz, the Initial_Clock_Ticks_Ext field is not present and only the Initial_Clock_Ticks_Base is present, and a value of the corresponding Initial_Clock_Ticks_Base is valid. When a value of the MCR_Resolution_Flag field is 0, it means that the frequency resolution of the MCR is 27 MHz, both of the Initial_Clock_Ticks_Ext field and only the Initial_Clock_Ticks_Base field are present, and the value of the corresponding Initial_Clock_Ticks_Base field and the value of the Initial_Clock_Ticks_Ext field are valid.

The Initial_Clock_Ticks_Base field may be configured of, for example, 33 bits and the value of the MCR clock ticks corresponding to an original service start time of the corresponding program is represented as the clock resolution of 90 kHz.

The Initial_Clock_Ticks_Ext field may be configured of, for example, 9 bits and the value of the MCR clock ticks corresponding to the original service start time of the corresponding program is represented by the clock resolution of 27 MHz.

The client receiving the MMT packets uses four timing information of FIG. 1 to calculate Absolute_Presentation_Time of each media object for synchronizing each media object delivered from a plurality of different servers, thereby making it possible to synchronize each media object delivered from the plurality of different servers under the heterogeneous network environment.

Referring to FIG. 2, the MMT layer includes function regions of an encapsulation layer, the delivery layer, and the control layer and the MMT layer is operated over the transport layer.

The encapsulation layer may be responsible for functions such as packetization, fragmentation, multiplexing, or the like, of the delivered.media.

The delivery layer may perform, functions such as network flow multiplexing, network packetization, QoS control, synchronization, or the like, of the media delivered through the network.

The D.2 layer 220 serves to deliver both of the packet streams delivered from the first server and the packet stream delivered from the second server to the D.1 layer. In the embodiment of the present invention, the D.2 layer is configured to include the timing information for synchronizing the packet streams delivered from the first server and the packet stream delivered from the second server in the header of the D.2 layer 220, thereby making it possible to synchronize the packet streams delivered from the first server and the packet streams delivered from the second server.

The D.1 layer serves to process the packets of the MMT payload format delivered from the D.2 layer and deliver the processed packets to an E.1 layer.

An MMT cross-layer design of the D.1 layer provides a function of exchanging the information between the layers and is operated to support the QoS.

The E.1 layer receives an MMT package from the D.1 layer and delivers the received MMT package to an E.2 layer. The MMT package is a set of MMT assets that include MMT assets.

The E.2 layer receives the MMT assets from the E.1 layer and delivers the received MMT assets to the E.3 layer. The MMT assets are a set of M-units that is configured of a plurality of M-units.

The E.3 layer receives the M-units from the E.2 layer.

The M-units is a set of media fragment units that include a plurality of media fragment units.

The control layer may perform functions such as session initialization/control/management, server based and/or client based trick mode, service discovery, synchronization, or the like, of the delivered media.

S.1 layer 210 serves to control the delivery layer. In another embodiment of the present invention, the S.1 layer is configured to include the timing information for synchronizing the packet streams delivered from the first server and the packet stream delivered from the second server in the control message of the S.1 layer, thereby making it possible to perform a control so that the packet streams delivered from the first server and the packet streams delivered from the second server are synchronized with each other.

The S.1 layer serves to control the encapsulation layer.

An example of a pseudo code for setting each field of the MMT timing information of FIG. 1 is shown below.

```
Network_synch_timestamp( ){
    If(Hybrid_Network_Synch_Flag=='1'{
        MCR_Resolution_Flag;           (1 bit)
    }
    If(MCR_Resolution_Flag =='1'{
        Initial_Clock_Ticks_Base;      (33 bit)
    }
    Else (MCR_Resolution_Flag =='0'{
        Initial_Clock_Ticks_Base;      (33 bit)
        Initial_Clock_Ticks_Ext;       (9 bit)
    }
}
```

The MMT packet to be delivered is an MMT packet including the timing information for synchronizing the hybrid delivery service or the value of the Hybrid_Network_Synch_Flag field is set to be 1 in the case of the control message. In this case, the value of the MCR_Resolution_Flag field is set to be 0 or 1.

When the timing information for synchronization is not present, the value of the Hybrid_Network_Synch_Flag field is set to be 0 and the values after the MCR_Resolution_Flag field are not present in the header of the MMT packet or the control message.

When the value of the MCR_Resolution_Flag field is set to be 0, the values of the Initial_Clock_Ticks_Base field and the Initial_Clock_Ticks_Ext field are set and when the value of the MCR_Resolution_Flag field is set to be 1, only the value of the Initial_Clock_Ticks_Base is set.

Figure 3:
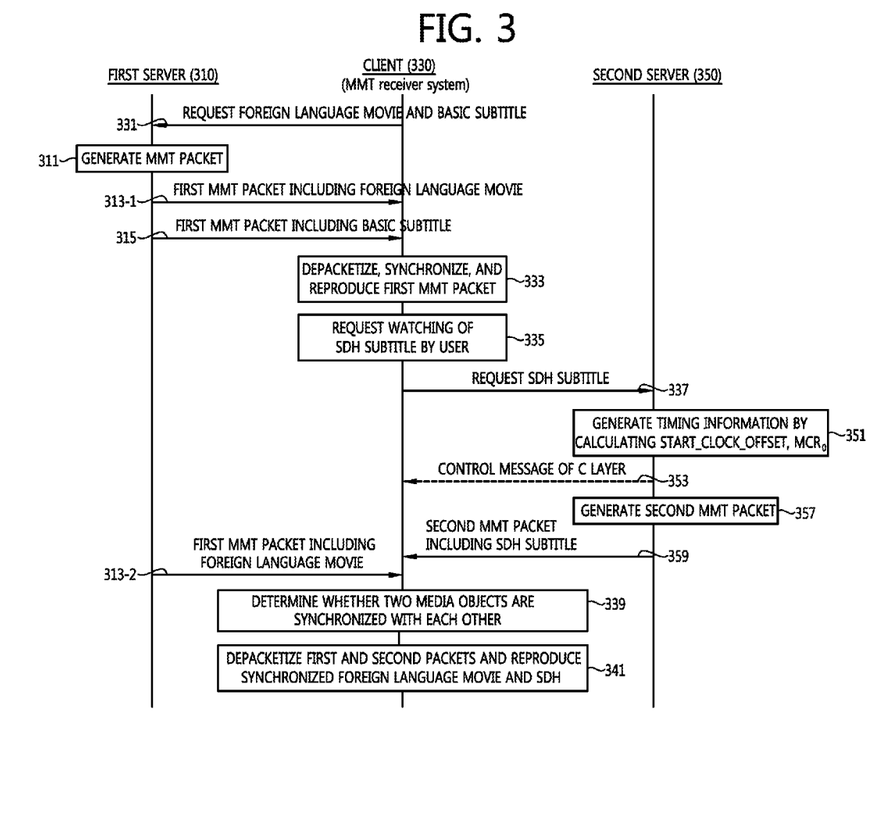
FIG. 3 is a flow chart of a data exchange procedure among a plurality of servers and an MMT client in accordance with the embodiment of the present invention under the MMT hybrid delivery service environment.

FIG. 3 is a flow chart of a data exchange procedure among a plurality of servers and an MMT client in accordance with the embodiment of the present invention under the MMT hybrid delivery service environment.

In detail, FIG. 3 exemplarily shows the data exchange procedure between the plurality of servers and the clients under the hybrid delivery service environment delivered from the plurality of different servers by the plurality of media objects configuring the single service. FIG. 3 shows, for example, the case in which the plurality of servers are two servers of a first server 310 and a second server 350, but the embodiment of the present invention may also be applied to the case in which the data exchange among three different servers and the clients is performed.

For example, the first server 310 may be a program stream server 310 and the second server 350 may be a supplemental information server. Alternatively, the first server 310 may be a server of providing a 3D left image and the second server 350 may be a server of providing a 3D right image.

Hereinafter, the data exchange procedure among a client 330 receiving the MMT packet, the program stream server 310, and a supplemental information server 350, for example, a method of providing timing information for synchronizing MMT packet streams in the MMT composite delivery service in accordance with the embodiment of the present invention will be described with reference to FIG. 3.

In this case, the case in which the first server 310, which is the program stream server, delivers data such as broadcast contents, or the like, for example, a foreign language movie to the client 330 through a broadcast network and the second server 350, which is the supplemental information server, delivers supplemental information such as subtitles for the deaf and hard-of-hearing (SDH) subtitle (caption) of the foreign language movie to the client 330 through a broadband network such as an IP network will be described by way of example.

First, the MMT client 330 delivers a message 331 requesting the foreign language movie and a basic subtitle to the first server 310.

The first server 310 packetizes the requested foreign language movie and basic subtitle into each MMT packet to generate the MMT packets including the requested foreign language movie and basic subtitle (S311) and deliver the generated MMT packets to the MMT client 330. In this case, each MMT packet is separately generated as an MMT packet 313-1 for a movie and an MMT packet 315 for a subtitle such as shown in FIG. 3 and may be delivered in a streaming type.

The MMT client 330 receiving the MMT packets 313-1 and 315 depacks or depacketizes the received MMT packets 313-1 and 315 to synchronize and reproduce the image and the subtitles (S333).

When the user wants to watch the SDH subtitle (S335), the MMT client apparatus 330 delivers an SDH subtitle request message 337 to the second server 350.

The second server 350 receiving the SHD subtitle request message generates the timing information (S351). In detail, the second server 350 writes the Hybrid_Network_Synch_Flag field and the MCR_Resolution_Flag field in the control message of the MMT S layer, for example, the control message of the MMT S.1 layer or the header of the MMT D layer, for example, the header of the MMT D.2 layer according to the delivery request of the media objects such as the SDH subtitle from the MMT client apparatus 330. The second server 350 calculates Start_Time_Offset that is a temporal difference value between the original start time and the actual start time of the requested media object (SDH subtitle) and calculates the Start_Clock_Offset value according to Equation 1 to be described below and calculates $MCR_0$ that is the MCR value of the first MMT packet delivered to the MMT client 330 according to Equation 2 to be described below.

The second server 350 sets the calculated Start_clock_offset and the calculated $MCR_0$ value of the first MMT packet in the Initial_Clock_Ticks_Base field or the Initial_Clock_Ticks_Base field and the Initial_Clock_Ticks_Ext field according to a system clock frequency (SCF) of the second server 350 delivering the MMT packet to generate the timing information (S351).

The second server 350 may deliver the timing information included in the control message 353 of the S layer to the MMT client apparatus 330, prior to delivering the SDH subtitle. Alternatively, the second server 350 may generate the MMT packet including the SDH subtitle and deliver the timing information included in the header of the D layer of a first MMT packet 359 including the SDH subtitle.

The second server 350 MMT-packetizes the SDH subtitle to deliver the MMT packet 353 including the SDH subtitle to the MMT client apparatus 330 (S357 and S359).

The MMT client apparatus 330 determines whether two media objects are synchronized with each other (S339). In detail, the MMT client apparatus 330 may determine whether the two media objects are synchronized with each other using each Absolute_Presentation_Time (APT) value of an i-th MMT packet for media object 1 (foreign language movie) streamed from the first server 310 and a j-th MMT packet for media object 2 (SDH subtitle) delivered from the second server 350.

That is, the MMT client apparatus 330 calculates the APT of the MMT packet received through each channel according to Equation 3 to be described below so as to synchronize the plurality of MMT packets delivered through different networks or channels from different servers, for example, the first server 310 and the second server 350 and the MMT client apparatus 330 compares the difference value of each of the obtained APTs with a reference value ($\Delta$ value) appropriately set in consideration of temporal precision of synchronization according to Equation 4 to be described below to determine whether the MMT packets are synchronized with each other.

The MMT client apparatus 330 depacks or depacketizes the MMT packet 313-2 including the foreign language movie received from the first server 310 and the MMT packet 359 including the SDH subtitle received from the second server 350, respectively, if it is determined that the MMT packets are synchronized with each other according to the determination result of the synchronization or not to synchronize the stream received from the first server 310 with the subtitle data received from the second server 350, thereby reproducing the foreign language movie while being synchronized with the SDH subtitle (S341).

Figure 4:
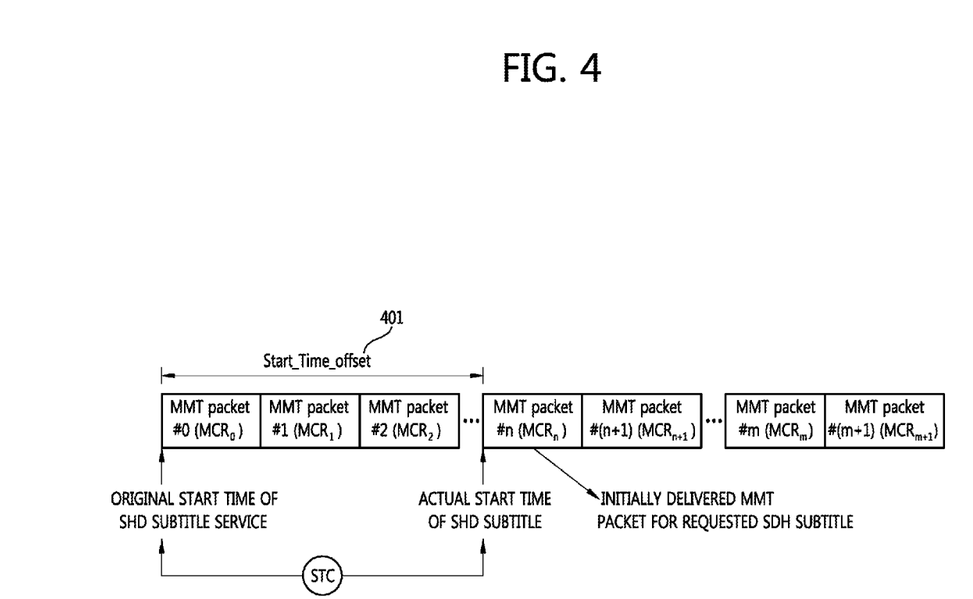
FIG. 4 is a diagram showing a timing relationship between the MMT packets that is considered at the time of delivering SDH subtitles requested in FIG. 3 by being carried on the MMT packets.

FIG. 4 is a diagram showing a timing relationship between the MMT packets that is considered at the time of delivering SDH subtitles requested in FIG. 3 by being carried on the MMT packets.

Referring to FIG. 4, the MMT packet number for the SDH subtitle actually generated from the second server 350 starts from 0 and when the initially delivered MMT packet number is set to be n by requesting the SDH subtitle from the MMT client 330, the original start time of the SDH subtitle service becomes a start of an 0-th MMT packet.

However, an actual start time of the SDH subtitle delivery becomes a start of an n-th MMT packet, such that the difference in the start time occurs. In this case, the difference between the actual start time and the original start time is referred to as Start_Time_Offset 401.

Equation 1 is to calculate the Start_Clock_Offset value obtained by converting the temporal difference value Start_Time_Offset 401 between the original start time and the actual start time of the requested media object into the SCF precision of the STC.

$$\text{Start\_Clock\_Offset} = \text{Start\_Time\_Offset} \times SCF \quad \text{[Equation 1]}$$

The calculated Start_Time_Offset is not used to calculate the MCR determined by the STC clock of each server and thus, Start_Clock_Offset obtained by converting the Start_Time_Offset into the SCF precision of the STC of each server is calculated.

Equation 2 is an equation for calculating the $MCR_0$ so as for the second server 350 to deliver the MCRO that is the MCR value of the first MMT packet to the MMT client 330.

$$MCR_0 = MCR_n - \text{Start\_Clock\_Offset} \quad \text{[Equation 2]}$$

The $MCR_0$ that is the MCR value of the first MMT packet may be calculated using an MCR value $MCR_n$ of an n-th MMT packet that is the MMT packet originally delivered by the second server 350 delivering the media object according to a request from the MMT client 330 and the Start_Clock_Offset (the difference value between the 0-th MMT packet and the n-th MMT packet).

The calculated $MCR_0$ value is delivered to the MMT client 330 by being set in the Initial_Clock_Ticks_Base field or both of the Initial_Clock_Ticks_Base field and the Initial_Clock_Ticks_Ext field according to the SCF of the server delivering the MMT packet of FIG. 1. The calculation of Equation 2 may be made when the timing information for providing the synchronization of the hybrid delivery service to the MMT client 330 are delivered by being included in the control message of the S layer or the header of the D layer of the first MMT packet (the n-th MMT packet of FIG. 4).

Equation 3 is an equation for calculating $APT_i$ that is the Absolute_Presentation_Time (APT) for any i-th MMT packet after the MMT client 330 receives the control message for providing the synchronization or the first MMT packet (the n-th MMT packet of FIG. 4) from the server.

$$APT_i = \frac{MCR_i - MCR_0}{SCF} \quad \text{[Equation 3]}$$

The MMT client 302 stores the value of the Initial_Clock_Ticks field received from the server as the value of the $MCR_0$. The value of the Initial_Clock_Ticks field may be included in the control message of the MMT S.1 layer and the header of the MMT D.2 layer of the MMT packet (the n-th MMT packet of FIG. 4) originally received from the server.

Next, when the i-th MMT packet is reached from the server, the MMT client 302 may calculate the $APT_i$ using the previously stored MCR₀ value in the case in which there is a need to calculate the APT of the corresponding packet.

Equation 4 is an equation for determining whether the two media objects are synchronized with each other by allowing the MMT client 330 to use each APT value of the i-th MMT packet for media object 1 and the j-th MMT packet for media object 2.

$$\left| APT_i^{Media\,component1} - APT_j^{Media\,component2} \right| < \Delta \quad \text{[Equation 4]}$$

The MMT client 330 obtains each APT value of the i-th MMT packet received from the first server 310 and the j-th MMT packet received from the second server 350 to determine that the synchronization can be implemented in the case in which the difference value in the two values is smaller than Δ value representing the temporal precision of the synchronization, thereby reproducing the two MMT packets together.

When the difference value in the two values is larger than Δ value, the combination of the MMT packets having the difference value smaller than Δ value is searched and reproduced. In this case, Δ value represents a synchronization bound and may be determined as an appropriate value in consideration of the synchronization precision.

When Δ value is set to be 0, the case in which the complete synchronization between the two MMT streams is required may be used. To this end, the value may be used in the case in which the two MMT streams delivered from different servers are operated based on the STC having the same resolution. When the Δ value is 0, it may be used in the case of the synchronization between the MMT stream for the left image and the MMT stream for the right image of the 3D image requiring, for example, the complete synchronization.

Figure 5:
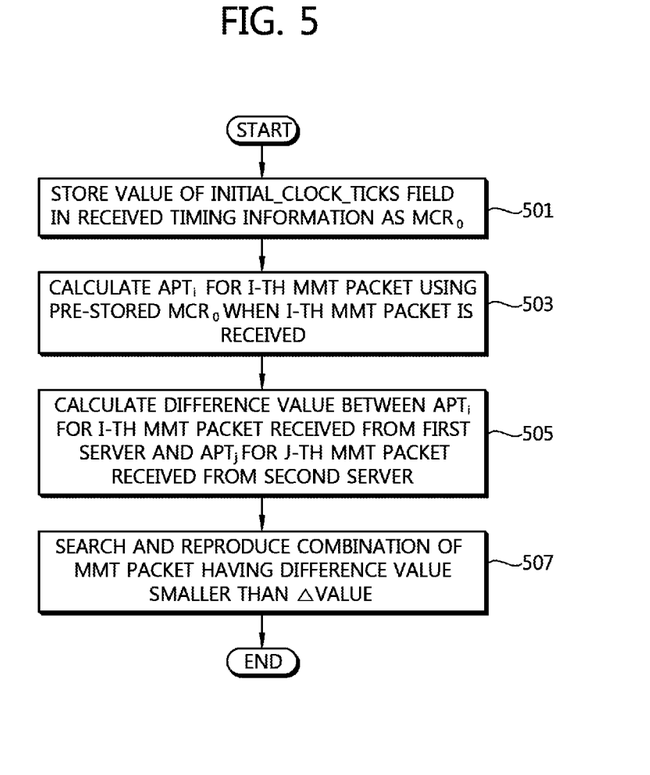
FIG. 5 is a flow chart showing a method of describing a reproducing process by determining whether a first media object and a second media object are synchronized with each other using timing information at a client in accordance with the embodiment of the present invention.

FIG. 5 is a flow chart showing a method of describing a reproducing process by determining whether a first media object and a second media object are synchronized with each other using timing information at a client in accordance with the embodiment of the present invention.

Referring to FIG. 5, The MMT client 302 stores the value of the Initial_Clock_Ticks field among timing information received from the server as the value of the MCRO(Step 501).

Next, when the MMT client 302 receives the i-th MMT packet from the server, the MMT client 302 calculates the APTi for i-th MMT packet using the previously stored MCRO value(Step 503).

The MMT client 302 calculates the difference value between APTi of the i-th MMT packet received from the first server 310 and the APTj of the j-th MMT packet received from the second server 350(Step 505).

The MMT client 302 searches for the combination of the MMT packets having the difference value smaller than ☐value and reproduces the searched MMT packets(Step 507).

Figure 6:
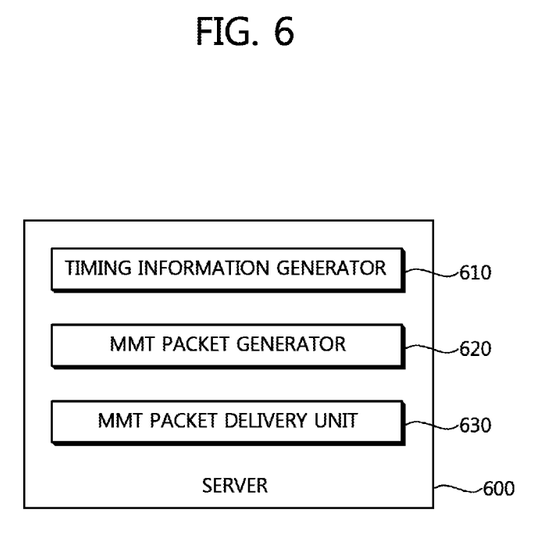
FIG. 6 is a block diagram of a server of providing timing information in accordance with an embodiment of the present invention.

FIG. 6 is a block diagram of a server of providing timing information in accordance with an embodiment of the present invention.

Referring to FIG. 6, in order to generate the timing information and provide the generated timing information to the client, a server 600 includes a timing information generator 610, an MMT packet generator 620, and an MMT packet delivery unit 630. The server 600, which is a server generating the timing information, may be, for example, the second server 350 of FIG. 3.

The timing information generator 610 generates the aforementioned timing information for synchronizing the packet including the second media object with the packet including the first media object. The timing information generator 610 delivers the timing information to the client by being included in the control message of the MMT S.1 layer or delivers the timing information to the client by being included in the header of the MMT D.2 layer.

The MMT packet generator 620 packetizes and generates the packet including the second media object. The MMT packet generator 620 may deliver the timing information included in the header of the MMT D.2 layer of the packet including the second media object to the client.

The MMT packet delivery unit 630 delivers the packet including the generated second media object to the client.

In accordance with the method of providing timing information for synchronizing the packet streams delivered from the first server and the second server, respectively, that are different from each other under the hybrid delivery service environment and the method of synchronizing packet streams, in the case of the hybrid delivery service delivered from different servers by the plurality of media objects configuring the single service, the timing information having a predetermined size is delivered by being included in the control message of the MMT Signal (S) layer, for example, the control message of the S.1 layer or the timing information having a predetermined size is delivered by being included in the header of the MMT delivery (D) layer, for example, the MMT D.2 layer. Therefore, the MMT client receiving the MMT packet streams can use the timing information to obtain Absolute_Presentation_Time for synchronizing each media object delivered from each server by the simple calculation.

As a result, even though several MMT packet streams are delivered through different channels or networks from different servers, the MMT client receiving the MMT packet streams can simultaneously output the plurality of MMT packet streams on the screen by temporally synchronizing the plurality of MMT packet streams.

Further, the timing information having a predetermined size is delivered to the MMT client from the server once, thereby preventing the traffic for the network from increasing and very simplifying the processing at the receiving side.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. A method of providing timing information for synchronizing
   packet streams delivered to a client from a first server and a second server, respectively, that are different from each other under a hybrid delivery service environment, the first server delivering a first packet including a first media object and the second server delivering a second packet including a second media object, the method comprising: generating, in the second server, timing information for synchronizing the second packet and the first packet with each other, wherein generating the timing information includes using a clock reference value of the first packet and using a clock reference value of the second packet; and providing, by the second server, the timing information and the second packet to the client.

2. The method of claim 1, wherein the timing information is provided to the client by being included in a control message of an MMT S.1 layer.

3. The method of claim 1, wherein the timing information is provided to the client by being included in a header of an MMT D.2 layer.

4. The method of claim 1, wherein the timing information for synchronizing the first packet and the second packet with each other is delivered only once from the second server to the client through a first MMT packet.

5. The method of claim 1, wherein the timing information includes:
an Hybrid_Network_Synch_Flag field that represents whether it includes timing information required for the synchronization;
an MCR_Resolution_Flag field that represents frequency resolution of an MMT clock reference (MCR);
an Initial_Clock_Ticks_Base field that represents an MCR clock value corresponding to an original service start time of the second media object as clock resolution of 90 kHz; and
an Initial_Clock_Ticks_Ext field that represents an MCR clock value corresponding to the original service start time of the second media object as clock resolution of 27 MHz.

6. The method of claim 5, wherein when a value of the Hybrid_Network_Synch_Flag field is 1, it represents that the packet to be currently delivered from the second server includes an MMT packet or a control message having the timing information for synchronizing the hybrid delivery service and the MCR_Resolution_Flag field is present and has a valid value; and
when a value of the Hybrid_Network_Synch_Flag field is 0, it represents that the packet to be currently delivered from the second server is not the MMT packet or the control message including the timing information for synchronizing the hybrid delivery service.

7. The method of claim 5, wherein when the value of the MCR_Resolution_Flag field is 1, it represents that the frequency resolution of the MCR is 90 kHz, the Initial_Clock_Ticks_Ext field is not present, only the Initial_Clock_Ticks_Base field is present, and the value of the Initial_Clock_Ticks_Base field is valid, and
when the value of the MCR_Resolution_Flag field is 0, it represents that the frequency resolution of the MCR is 27 MHz, both of the Initial_Clock_Ticks_Base field and the Initial_Clock_Ticks_Ext field are present, and the values of the Initial_Clock_Ticks_Base field and the Initial_Clock_Ticks_Ext field are valid.

8. The method of claim 5, wherein the second server calculates a Start_Clock_Offset value obtained by converting Start_Time_Offset, a temporal difference value between an original start time and an actual start time of a program of the second media object into system clock frequency (SCF) precision of a system time clock (STC) of the second server,
the second server subtracts the Start_Clock_Offset value from an MCR value MCRn of the packet of the second media object initially delivered to the client to calculate the MCR value $MCR_0$ of the first packet delivered to the client, and
the second server sets the calculated $MCR_0$ value in the Initial_Clock_Ticks_Base field or both of the Initial_Clock_Ticks_Base field and the Initial_Clock_Ticks_Ext field according to the SCF of the second server.

9. The method of claim 1, wherein the second server is a supplemental information server that delivers data of supplemental information through a broadband channel and the first server is a program stream server delivering data of broadcast contents such as a foreign language movie through a broadcast channel.

10. The method of claim 1, wherein the generating timing information for synchronizing a second packet including the second media object and a first packet including the first media object with each other in the second server is performed when the second server receives a delivery request for the second media object from the client.

11. A method of synchronizing packet streams delivered from a
first server and a second server to a client, respectively, that are different from each other under a hybrid delivery service environment, the first server delivering a first packet including a first media object to the client and the second server delivering a second packet including a second media object to the client, the method comprising: generating, in the second server, timing information for synchronizing the second packet and the first packet , wherein generating the timing information includes using a clock reference value of the first packet and using a clock reference value of the second packet; and determining, in the client, whether the first packet and the second packet are synchronized with each other by using the timing information.

12. The method of claim 11, wherein the timing information is provided to the client by being included in a control message of an MMT S.2 layer.

13. The method of claim 11, wherein the timing information is provided to the client by being included in a header of an MMT D.2 layer.

14. The method of claim 12, wherein at the determining whether the first packet including the first media object and the second packet including the second media object are synchronized with each other by using the timing information in the client, it determines whether the first packet and the second packet are synchronized with each other by calculating first Absolute_Presentation_Time of the first packet and second Absolute_Presentation_Time of the second packet for synchronizing the first packet including the first media object received from the first server and the second packet including the second media object received from the second server using the timing information in the client.

15. The method of claim 12, wherein after the client receives a control message for providing synchronization from the second server or initially receives the second packet, APTi that is Absolute_Presentation_Time (APT) for any i-th second packet is calculated by the following Equation $$APT_i = \frac{MCR_i - MCR_0}{SCF}$$

where $MCR_0$ is an MCR value of an initial second packet delivered to the client, the SCF is a system clock frequency, and the $MCR_i$ is an MCR value of any i-th second packet.

16. The method of claim 13, wherein at the determining whether the first packet including the first media object and the second packet including the second media object are synchronized with each other by using the timing information in the client, it is determined whether the first packet and the second packet are synchronized with each other by comparing a difference value between the first Absolute_Presentation_Time of the first packet and the second Absolute_Presentation_Time of the second packet with a reference value.

17. The method of claim 11, further comprising: reproducing the first and second packets together by determining that the first packet and the second packet are synchronized with each other when the difference value between the first Absolute_Presentation_Time of the first packet and the second Absolute_Presentation_Time of the second packet is smaller than the reference value.

18. A first server configured to provide timing information for synchronizing packet streams delivered to a client from the first server and a second server, respectively, that are different from each other under a hybrid delivery service environment, the first server delivering a first packet including a first media object and the second server delivering a second packet including a second media object, the first server comprising: a timing information generator configured to generate, using a clock reference value of the first packet and a clock reference value of the second packet, timing information for synchronizing the first packet and the second packet with each other; an MPEG Multimedia Transport (MMT) packet generator configured to packetize and generate the first packet; and an MMT packet delivery unit configured to deliver the first packet to the client.

19. The server of claim 18, wherein the timing information generator is configured to deliver the timing information included in a control message of an MMT S.2 layer to the client.

20. The server of claim 18, wherein the timing information generator is configured to deliver the timing information included in a header of the MMT D.2 layer to the client through the packet including the second media object.

* * * * *